No. 859,769. PATENTED JULY 9, 1907.
H. A. HILL.
STATION INDICATOR.
APPLICATION FILED JAN. 10, 1906.

WITNESSES:

INVENTOR
Homer A. Hill
BY
Munn & Co
ATTORNEYS

No. 859,769.

PATENTED JULY 9, 1907.

H. A. HILL.
STATION INDICATOR.
APPLICATION FILED JAN. 10, 1906.

WITNESSES:

INVENTOR
Homer A. Hill
BY
Munn & Co
ATTORNEYS

No. 859,769. PATENTED JULY 9, 1907.
H. A. HILL.
STATION INDICATOR.
APPLICATION FILED JAN. 10, 1906.

WITNESSES:

INVENTOR
Homer A. Hill
BY
ATTORNEYS

No. 859,769.

PATENTED JULY 9, 1907.

H. A. HILL.
STATION INDICATOR.
APPLICATION FILED JAN. 10, 1906.

WITNESSES:

INVENTOR
Homer A. Hill
BY
Munn & Co
ATTORNEYS

No. 859,769. PATENTED JULY 9, 1907.
H. A. HILL.
STATION INDICATOR.
APPLICATION FILED JAN. 10, 1906.

INVENTOR
Homer A. Hill
BY
Munn & Co
ATTORNEYS

WITNESSES:

UNITED STATES PATENT OFFICE.

HOMER ALLIN HILL, OF DELAFIELD, WISCONSIN.

STATION-INDICATOR.

No. 859,769.

Specification of Letters Patent.

Patented July 9, 1907.

Application filed January 10, 1906. Serial No. 295,417.

*To all whom it may concern:*

Be it known that I, HOMER ALLIN HILL, a citizen of the United States, and a resident of Delafield, in the county of Waukesha and State of Wisconsin, have invented a new and Improved Station-Indicator, of which the following is a full, clear, and exact description.

This invention relates to improvements in station indicators for railway cars and street indicators for street railway cars, the object being to provide an indicator with the parts so arranged as to automatically and positively indicate the various places, thus not only adding to the general comfort of the traveling public but to relieve the attendants from calling out the stations.

Another object is to provide in connection with the indicating sheet or sheets, a movable sheet bearing various advertisements, the income from which will greatly reduce the cost of installing the device.
Other objects of the invention will appear in the general description.

I will describe a station indicator embodying my invention and then point out the novel features in the appended claims.
Reference is to be had to the accompanying drawings forming a part of this specification, in which similar characters of reference indicate corresponding parts in all the figures.

Figure 1 is a side elevation of a car showing an indicator embodying my invention;
Fig. 6 is a general plan of the actuating mechanism.

Referring to the drawings, 15 designates a casing for the indicator, the said casing being arranged conveniently in the forward end of a car. The front of the casing between panels at its upper and lower end is open as indicated at 17, through which the indicating aprons of the stations arranged therein may be seen, as will be hereinafter described. It may be here stated that the particular station to be indicated will be pointed out by an arrow 18 which is at about the center of the opening 17.

Movable in the casing is the outer or endless apron 19 which bears upon it the names of streets or the like, and also arranged in the casing rearwards of the apron 19 is an apron 20, the lower ends of which engage respectively with spring rollers 21, 22 which will take up the slack as the said apron moves in either direction. The apron 20 passes along the front side of an idler roller 23 and the stations marked on said apron 20 are disclosed through the opening 17 in the front of the casing and also through an opening 24 formed in the endless apron. The edges of the endless apron are provided with perforations to receive the projections 25 on wheels 26 mounted on a shaft 27 which is the actuating shaft for the endless apron, as will be hereinafter described.

A spring-pressed arm 28 has a roller 29 at its end, designed to engage in any one of the depressions formed in a retarding-wheel 30 on said shaft 27. The inner apron 20 is also provided at its edges with perforations to receive projections 31 on rollers 32 attached to an actuating shaft 33 and on this shaft is a retarding wheel 34 engaged by a roller 35 on a spring-pressed arm 36. It is obvious that these retarding devices will prevent the aprons from moving too far by any excessive impulse.

On the shaft 27 is a beveled pinion 37 which engages with a beveled pinion 38 on a vertical shaft 39 and on the shaft 33 is a beveled pinion 40 meshing with a beveled pinion 41 on a vertical shaft 42. These shafts have driving connection with actuating devices underneath the car, as will be fully described.

Figure 1:
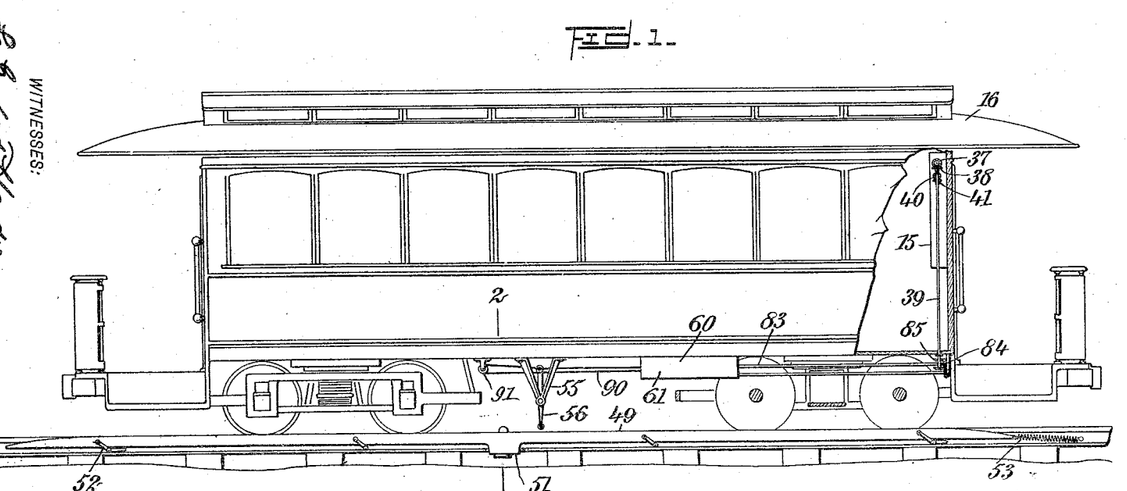
Figure 2:
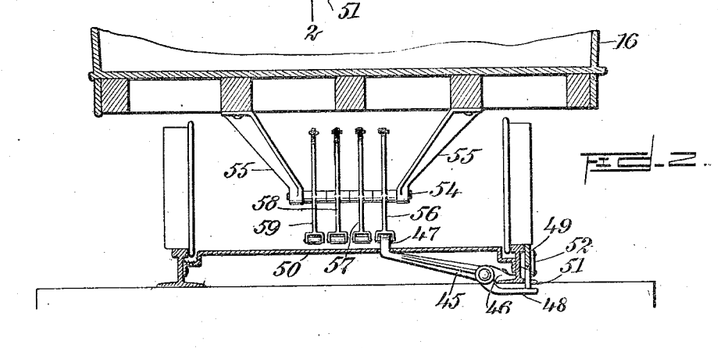
Fig. 2 is a section on the line 2—2 of Fig. 1, showing an actuating mechanism employed.
Figures 3, 4, 5:
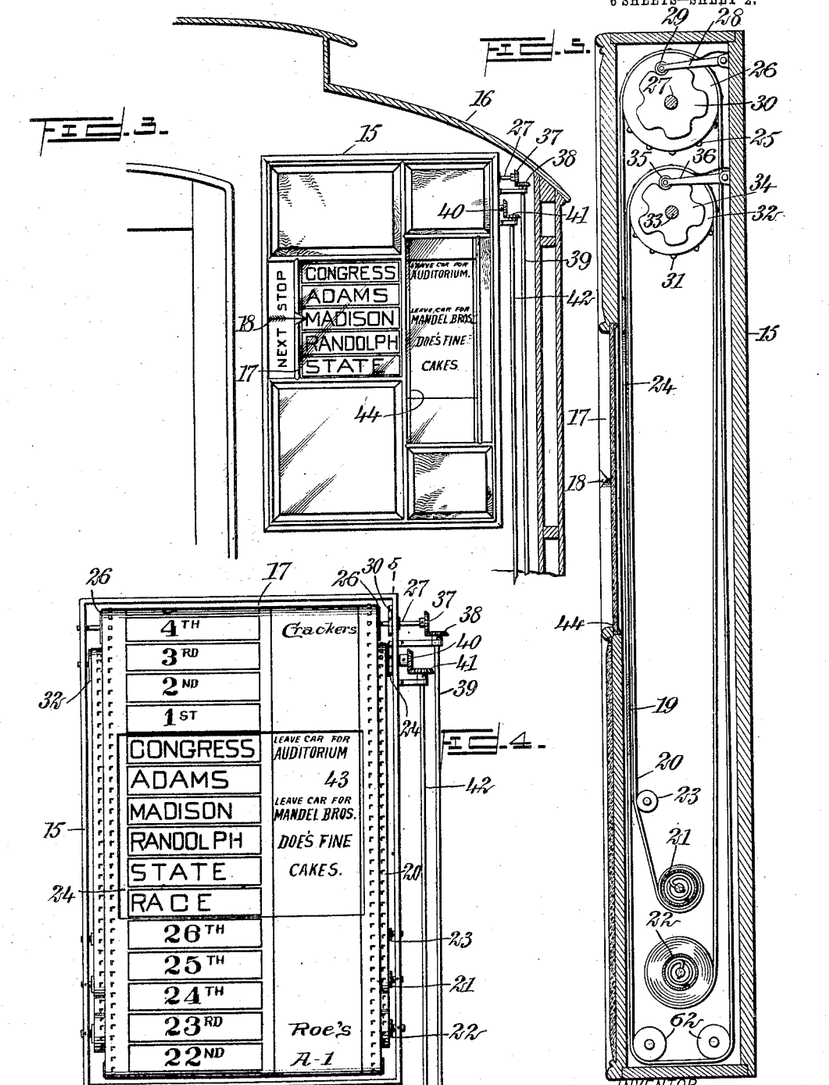
Fig. 3 is a front view of an indicator as arranged in a car.
Fig. 4 is a front elevation with the front of the casing removed.
Fig. 5 is a section on the line 5—5 of Fig. 4.
Figure 5:
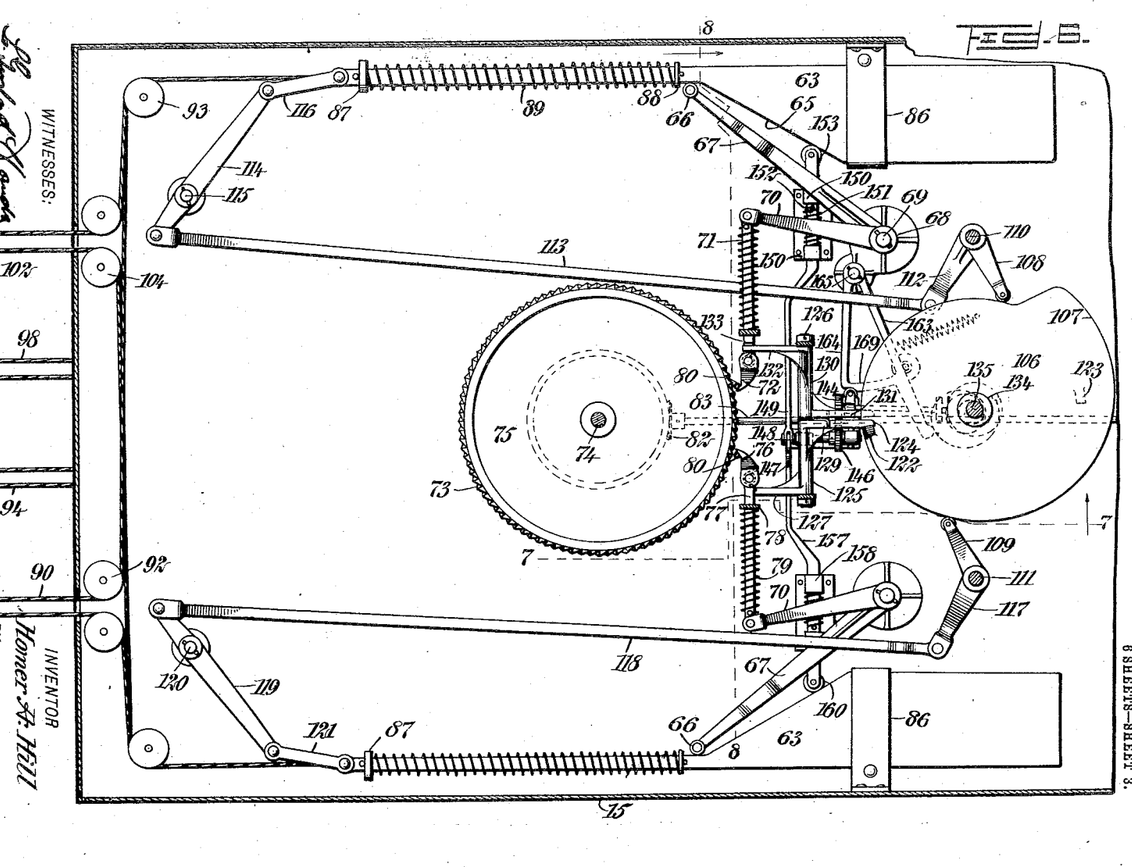

Carried by the aprons at one side are extensions 43 which are divided into spaces and in each space advertising matter may be placed so that the same will be disclosed one at a time through the opening 44 in the front of the case, this opening being covered by glass as is also the opening 17.
I will now describe means for actuating the aprons, the said means being controlled by abutments arranged along the track. These abutments consist of arms 45 mounted to swing on lugs 46 secured to the flange of one of the rails. The arm has an upward projection 47 for engaging with swinging devices to be hereinafter described; this abutment or arm has a finger 48 extended underneath the rail and engaged by a pressure bar 49 arranged at the outer side of the rail and designed to be forced downward by the wheels of a car, to move the ends 47 of the abutments up through openings in a plate 50 extended a suitable distance between the track rails, and which in Fig. 2 is shown as secured to the rails; but other constructions may be employed without departing from the spirit of my invention, and it is to be understood that the bar is to be operated by a car moving in either direction.

The bar 49 bears directly upon a finger 48 through the medium of a lug 51 on the lower side of said bar near its center, and the bar has swinging connection with the rail by means of links 52. By this connection it will be seen that when the wheels of a car engage with the upper side of a bar, the said bar will not only have a downward movement but will also have a longitudinal movement and when a car passes over the bar, it will be drawn to normal position by means of a spring 53 attached at one end to the bar and at the other end to some fixed device, for instance one of the track rails. When a car passes over and the bar moves upward, the arm 45 will swing downward by gravity, bringing the projection 47 below the plane of the plate 50 and therefore I term the device a "disappearing abutment" and obviously by swinging below the plate it will not form an obstruction by catching with chains or like devices that may be dragging from a car or interfere with street traffic.

On a rod 54 supported in hangers 55 depending from the bottom of the car, is mounted to swing, a plurality of levers 56, 57, 58 and 59, the levers of a pair co-acting at certain times one with the other, that is, under certain conditions the levers 56 and 58 coöperate when the car is moving in one direction, and the levers 57 and 59 coöperate at certain times when the car is moving in the reverse direction.

Secured to the under side of the car is a casing consisting of suitable metal and having an upper chamber 60 and a lower chamber 61, these chambers containing controlling devices for the aprons; that is, the devices in the upper chamber operate the inner apron 20; while the devices in the lower chamber operate the endless apron. This endless apron, it will be noted, passes around idler rollers 62 in the lower portion of the casing. As the mechanism is of like construction in both chambers and also of like construction in opposite sides of each chamber, a detailed description of one will answer for all.

Figure 7:
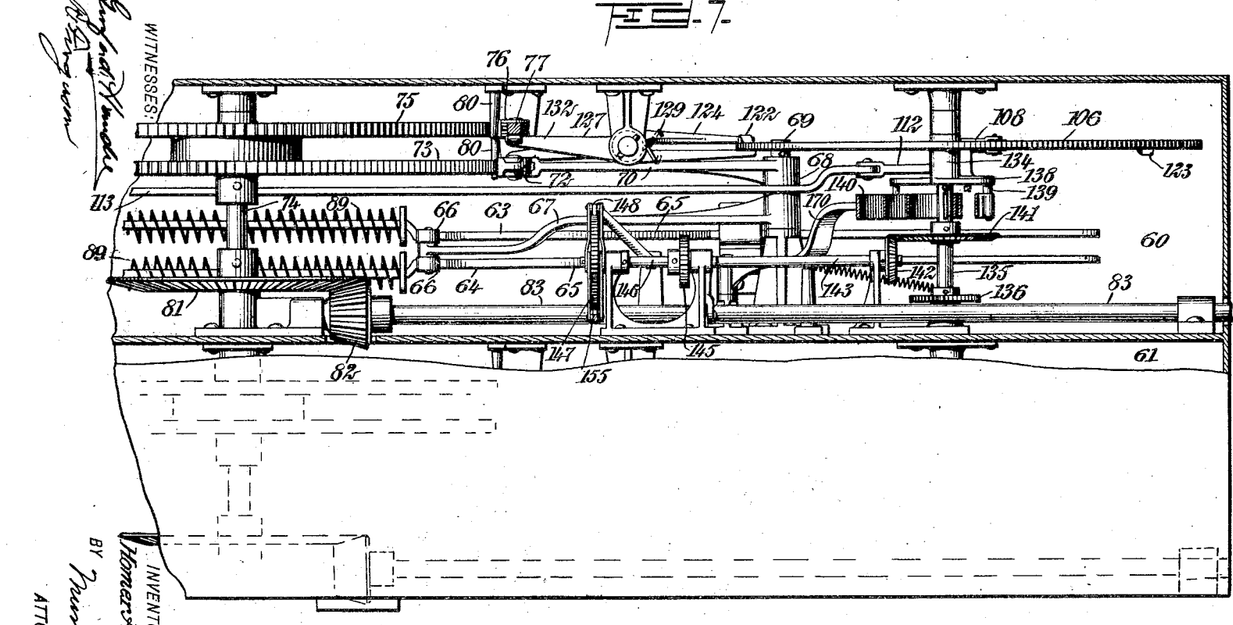
Fig. 7 is a section on the line 7—7 of Fig. 6.
Figures 8, 9:
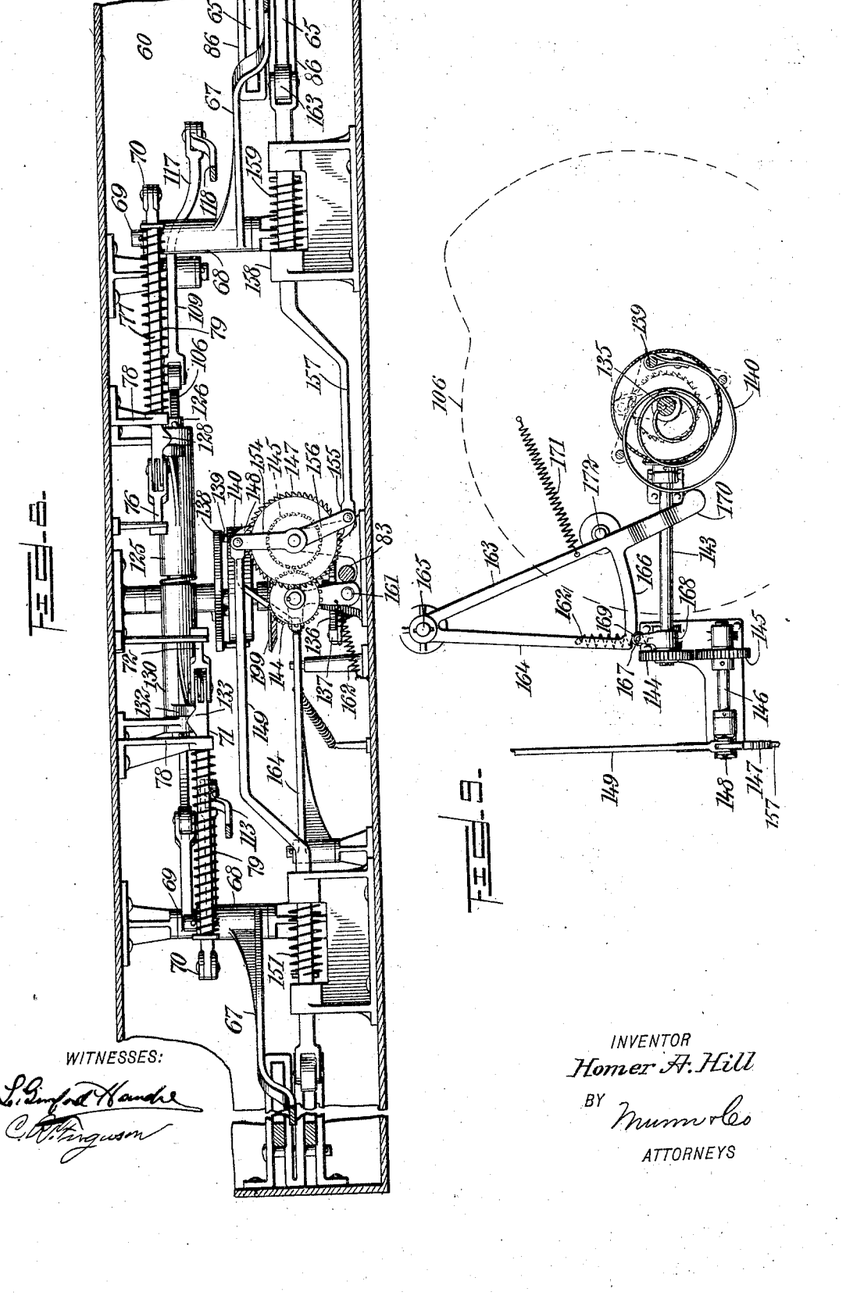
Fig. 8 is a section on the line 8—8 of Fig. 6.
Fig. 9 is a detent illustrating an automatic means for operating the cam employed.
Figure 10:
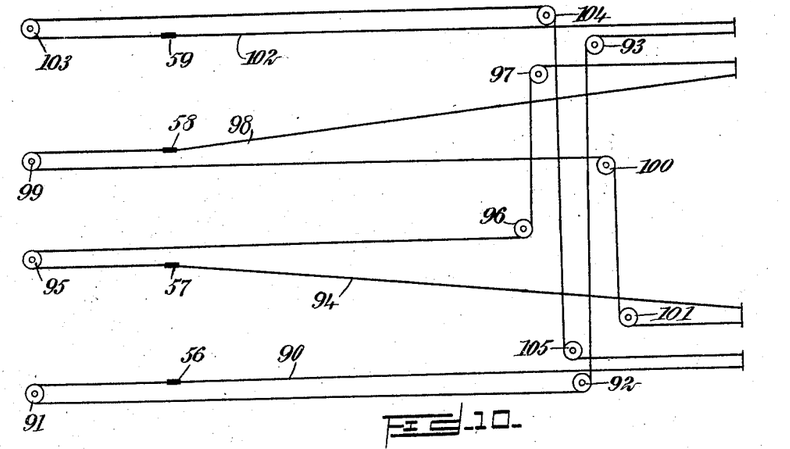
Fig. 10 is a diagrammatic view of the shifting cords, chains or cables.

In each chamber at opposite sides are two bars 63, 64 arranged one above the other and having cam-shaped or inclined portions 65 with which a roller 66 on an arm 67 is designed to engage, this arm being extended from a sleeve 68 on a vertical shaft 69. The rollers 66 are arranged both at the upper and lower sides of the arm 67 so as to engage with the cam surfaces of both the upper and lower bars 63, 64 as clearly indicated in Fig. 7.

Extended rearward from the sleeve 68 is an arm 70 pivotally connected to the free end of the arm 70 at one side of the casing is a rod 71 which carries a pawl 72 designed for engagement with a ratchet-wheel 73 fixed to a shaft 74; also fixed to the shaft 74 above the ratchet-wheel 73 is another ratchet-wheel 75 having its teeth extended in an opposite direction from the teeth on the wheel 73 and this upper wheel is designed to be engaged for a reverse movement of the device by a pawl 76 carried by a rod 77 pivoted to the free end of the other arm 70 and actuated by the upper bar 63 at the opposite side of the casing to that of the bars above described.

The pawl-carrying bars are movable in guide-plates or hangers 78 and are moved in one direction by springs 79. It will be noted also, that the pawls not in operation will be held out of engagement with their ratchet-wheels by pins 80 with which said pawls engage when the rods are drawn outward.

Mounted on the shaft 74 is a beveled wheel 81 meshing with a beveled pinion 82 on a shaft 83 which extends outward through the front end of the casing and has at its forward end a beveled pinion 84 meshing with a beveled pinion 85 on the vertical shaft 42 which actuates the inner apron.

The forward or broad ends of the cam bars 63 are movable in straps 86, while the rear or stem portions move in fixed bearings 87 and between these fixed bearings 87 and collars 88 on the stem portions are springs 89 which surround said stem portions and serve to move the cam bars to normal or forward position.

I will now describe the means controlled by the device 45 along the track, for moving the lower cam portion at each side in each compartment.

From the upper end of the lever 56 a rope or cable 90 extends forward into the upper chamber of the casing and connects with the lower cam bar at one side. This cable 90 also extends rearward from the lever 56 around a pulley 91, thence forward around a pulley 92, and thence across the casing over a pulley 93 to connection with the lower cam-bar at the opposite side of the casing. From the lever 57 a rope or cable 94 has a forward extension also engaging with the lower cam-bar at one side in the lower section of the casing and this cable has a rearward extension which passes around a pulley 95 thence forward around a pulley 96 across the casing to connection with a pulley 97, and thence forward to connection with the lower cam-bar at the opposite side of the casing. From the lever 58 a rope or cable 98 has a portion extended forward to connection with the lower cam-bar at one side in the lower chamber of the casing and this cable 98 also extends rearward from the lever 58 around a pulley 99, thence forward and transversely around pulleys 100, 101 to connection with the lower cam-bar; at the opposite side of the chamber a cable 102 has a portion extended forward from the lever 59 to connection with the lower cam-bar at one side in the upper chamber of the casing, and this cable also extends rearward around a pulley 103 thence forward and transversely around pulleys 104, 105 to connection with the lower cam-bar at the opposite side of said upper chamber.

I will now describe a means for preventing a forward or registering movement of the apron or aprons should accident occur and it is necessary to back the train; in other words, it is obvious that the station forward of the one last stopped at by the train should be brought into registering position during the backing movement of the train. This means consists of a cam-plate or disk 106 having a peripheral cam projection 107 designed to engage with and rock either one of the arms 108 or 109 mounted on shafts 110, 111, and on the shaft 110 is an arm 112 from which a rod 113 extends to pivotal connection with the short end of a lever 114 mounted to swing on a stud 115, and the longer member of this lever 114 is connected by means of a link 116 with the stem portion of the upper cam-bar 63 at one side of a chamber in the casing.

Extended from the shaft 111 is an arm 117 having a rod connection 118 with the short member of a lever 119 pivoted on a stud 120 and the longer member of this lever 119 has a link connection 121 with the upper cam-bar at the opposite side of the chamber.

On the upper surface of the cam-plate 106 is a lug 122 and on the under side of the said cam-plate diametrically opposite the lug 122 is another lug 123. The upper lug 122 is designed to be engaged with a finger 124 carried by a rocking sleeve 125 mounted on a rod 126 supported in suitable hangers.

Extended rearward from the sleeve 125 and engaging against the under side of the pawl-carrying-rod 77 is a finger 127 which at a certain time is designed to be engaged by a cam-lug 128 carried on the under side of the said shaft 77. The finger 124 is held yieldingly against the cam-plate by means of a spring 129, and of course, this spring holds the finger 127 yieldingly against the rod 77. Another sleeve 130 is mounted on the rod 126 and has a finger 131 engaging against the under side of the cam-plate 106 and designed to be engaged by the under lug 123 on said plate.

Extended rearward from the sleeve 130 is an arm 132 which engages with the upper side of the rod 71 and is designed to be operated by a cam-lug 133 on the upper side of said rod.

The cam disk 106 is attached to a sleeve 134 which is loosely mounted on a vertical shaft 135 on which is a ratchet-wheel 136 engaged by a spring-pressed pawl 137 to prevent backward movement of said shaft. Rigidly attached to the disk 106 or to the sleeve 134 is a plate 138 having a depending lug 139 with which the outer end of a spring 140 connects, the other or inner end being connected to the shaft 135; this spring is designed at certain times to rotate said cam-plate 106 and I have provided means for rewinding said spring for future action. This means consists of a beveled-wheel meshing with a beveled pinion 142 and a winding shaft 143, and on this winding shaft is a pinion 144 designed for re-winding purposes to engage with a pinion 145 on a shaft 146 carrying a ratchet-wheel 147 which is engaged at the upper side by a spring yielding pawl 148 having connection with a rod 149 extended outward through guides 150 with a spring 151 surrounding it between the guides, the spring at one end engaging with the inner guide-member and the outer end of the spring engaging with a pin 152 on the rod. The outer end of the rod has a roller 153 which engages with the cam or inclined surface of the lower bar 64 at one side of the casing.

The pawl 148 has pivotal connection with arms 154 mounted to swing on the shaft of the ratchet-wheel 147. A similar pawl 155 has pivotal connection with arms 156 mounted to swing on said shaft and this pawl engages with the ratchet-wheel 147 at the lower side; therefore, each pawl will operate the ratchet-wheel in the same direction.

The pawl 155 is carried by a rod 157 movable in guides 158 and is moved in one direction by means of a spring 159 arranged similar to the spring 151 and the outer end of the rod 157 has a wheel or roller 160 which engages with the cam surface of the bar 64 at the opposite side of the chamber from that with which the roller 153 engages.

The pinion 144 is mounted in swinging bearings 161 and is held yieldingly by means of a spring 162 connecting at one end with the swinging carrier and at the other end to a fixed part.

It is necessary in unwinding, that the spring shall project outward on one side only, that is, toward the pinion 144 so that when fully expanded, the spring will operate to cause the pinion 144 to mesh with the pinion 145. For this purpose I use a lever having divergent members 163, 164 pivoted at the junction on a stud 165.

At their free ends the members 163, 164 are connected by a curved cross-bar 166 designed by engaging with the roller 167 mounted on an arm 168 which is mounted on shaft 143, to cause a movement of the pinion 144 to engage it with the pinion 145; the said curved bar 166 is provided at the end connecting with the member 164 with a shoulder 169 against which the roller 167 will rest when the said pinion 144 is out of mesh with the pinion 145.

The member 163 has an extension 170 designed to be engaged by the draw-coil of the spring 140 when the said spring is expanded, and the said members 163, 164 are moved toward the spring and held yieldingly by means of a spring 171 but prevented from moving too far toward the spring by means of a stop-lug 172.

In the operation of this mechanism, assuming the pawl 72 to be operating its ratchet wheel, each movement of said pawl by means of the cam carried by the rod 71 will, of course, rock the sleeve 130, consequently moving the finger 131 up and down. The cam-plate will be held stationary at this time, however, as the lug 122 engages with the finger 124. Should it be necessary to back the train or a car, the depending lever 56 by engaging with the opposite side of the projection 47 will cause the operation of the pawl 76 and the movement of this pawl will rock the sleeve 125, elevating the finger 124, permitting the lug 122 to pass underneath the same so that the spring 140 will rotate the cam disk until the lug 123 comes into contact with the finger 131, which of course, will stop the plate, and during this movement of the cam the projection 107 will rock the shaft 111 which by drawing upon the rod 118 will draw the upper plate 163 in operative direction, and as during the rotary movement of the cam-plate, the spring 140 expands the outer coil thereof, as before mentioned, by engaging with the projection 170 on the member 163 will rock the controlling device so that the curved bar 166 will move upon the roller 167, forcing the pinion 144 into engagement with the pinion 145 and therefore the under pawl 155 will actuate the ratchet wheel 147, causing a re-winding of the spring through the medium of the shafting and gear connections. As the spring re-winds, the spring 171 will draw the members 163, 164 back to normal position, permitting the pinion 144 to move out of mesh with the pinion 145.

Figure 11:
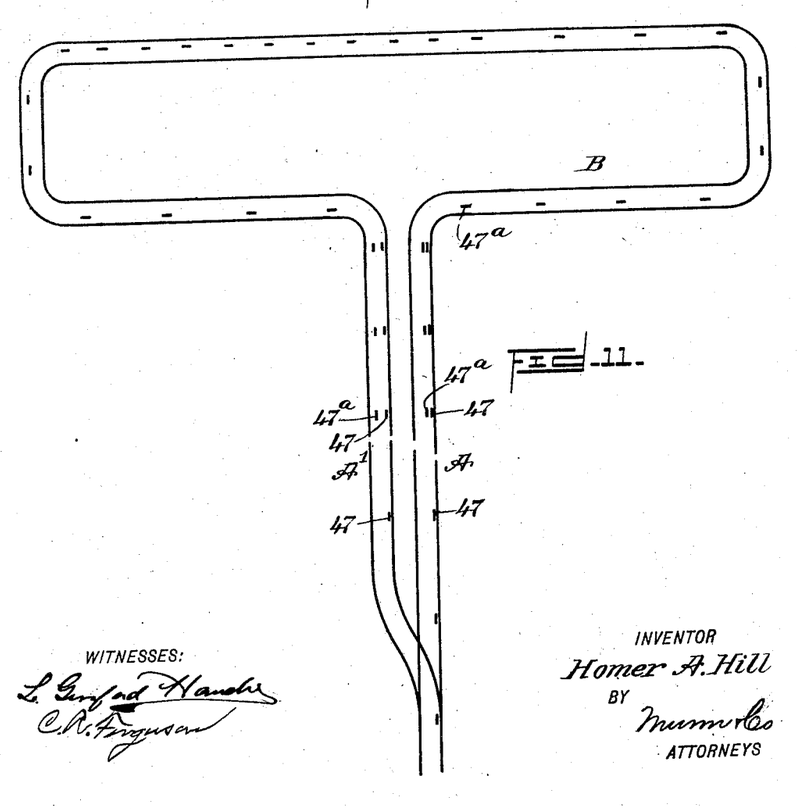
Fig. 11 is a diagrammatic view of the main tracks and a loop showing the manner of arranging the tripping devices thereon.

Referring to the diagrammatic Fig. 11, A, A′ indicate the main lines, and B a loop. The obstructions or tappets 47 are arranged at suitable distances apart or at the several stations, near the outer rail of the main line A; they are arranged near the track and are designed for engagement with the swinging lever 56 to operate the inner apron 20. Arranged inward of the obstructions 47 are other obstructions 47ª which are arranged at any suitable point distant from the loop, and these obstructions 47ª are designed to engage with the lever 57, thus simultaneously moving the two aprons until the loop is reached, when the obstructions 47ª at the stations along the loop and which are in line with the obstructions 47ᵃ in the main line, will continue to operate the lever 57, keeping the outer apron in movement while the inner apron remains stationary.

It will be understood that there will be in surrounding the loop, a complete movement of the outer apron so that the stations marked on the inner apron will be again disclosed through the opening in the outer apron.

In the main line A' the main obstructions or tappets are arranged adjacent to the inner rails while the obstructions 47ᵃ are arranged between the first-named obstructions and the outer rails; these obstructions being respectively designed for engagement with the levers 57 and 59, causing a reverse movement of the aprons until the last obstruction 47ᵃ is reached when the outer apron will remain stationary and the inner apron be intermittingly moved to indicate the stations on the return trip. The upper and lower chambers 60, 61 of the casing contain independent duplicate mechanisms, one connected to operate the outer apron, the other to operate the inner apron. On the going portion of the route the lower cam bar of one chamber operates to move the names' apron intermittingly, while on the return trip, the lower cam bar at the opposite side of the same chamber operates the apron to indicate the stations. To equip a car system which has no loop, to travel, only one chamber mechanism and one apron will be required.

This device is not confined to a car as it may be used in the cab of a locomotive.

Having thus described my invention I claim as new, and desire to secure by Letters Patent:—

1. A station indicator comprising a casing arranged in a car, an endless outer apron having station indicating marks thereon, the said outer apron having an opening, an inner apron having station indicating marks thereon designed to be disclosed through the opening in the outer apron, means for automatically causing intermittent motion of the inner apron as a car is passing over the main line, while the outer apron remains stationary, and means for causing a movement of the outer apron while the inner apron remains stationary.

2. A station indicator comprising a casing arranged in a car, an outer endless apron arranged in the casing and having station indicating matter thereon, the said endless apron also having an opening, an inner apron, spring rollers to which the ends of the inner apron are attached, means for automatically causing intermittent movement of the inner apron while the outer apron remains stationary, means for causing intermittent motion of the outer apron while the inner apron remains stationary, and means for automatically operating an apron should a car be moved in a backward direction.

3. A station indicator comprising in combination with a car a casing arranged within a car, an endless station indicating apron arranged in the casing and having an opening, an inner station indicating apron, driving sprockets engaging with the aprons, vertical shafts having driving connection with said sprockets, horizontal shafts having driving connections with said vertical shafts, a casing secured to the bottom of the car, ratchet mechanisms for operating said horizontal shafts, devices arranged in the casing for actuating the ratchet mechanisms, swinging levers carried by the car and having connection with said devices, and tappets or obstructions arranged along the track for swinging said levers.

4. A station indicator comprising in combination with a car a casing arranged in the car, independently movable indicating aprons arranged in the casing one inwards of the other, the outer apron having an opening through which a portion of the inner apron is disclosed, a casing attached to the bottom of the car, a vertical shaft in the casing, a pair of ratchet wheels on said shaft and having their teeth extended in opposite directions, driving connection between said shaft and one of the aprons, pawls for engaging the said ratchet wheels, sliding cam-bars for operating the pawls, swinging devices on the bottom of the car for moving said cam-bars in one direction, devices arranged along the track at suitable points for swinging said swinging devices and means for operating the other apron.

5. The combination with a car, of a station indicator comprising a casing arranged in the car, a pair of indicating aprons arranged in the casing one inwards of the other, the outer apron having an opening through which the indicating matter on the inner apron is disclosed, a casing attached to the bottom of the car and divided into upper and lower chambers, mechanism in the upper chamber having driving connection with one of the aprons, mechanism in the lower chamber also having driving connection with one of the aprons, and devices carried by the car for actuating said mechanisms.

6. The combination with a car, of a station indicator comprising a casing, indicating aprons arranged therein one inwards of the other, means for operating the inner apron the outer apron having an opening through which matter on the inner apron may be disclosed, a casing attached to the bottom of the car, a vertical shaft in said casing, ratchet wheels secured to said shaft one above the other and having their teeth extended in opposite directions, pawls for engaging with the ratchet wheels, a cam bar at one side of the casing for actuating one of said pawls, a cam-bar at the opposite side of the casing for actuating the other of said pawls, driving connection between said vertical shaft and the outer apron, levers mounted to swing on the bottom of the car, and flexible connections between said levers and the cam bars.

7. The combination with a car of a station indicator comprising a casing, two indicating aprons arranged in the casing one inwards of the other, means for operating the inner apron the outer apron being provided with an opening, a casing attached to the bottom of the car, a vertical shaft in said casing and having operative connection with the outer apron, ratchet wheels arranged one above the other on said shaft, the teeth of the two wheels being extended in opposite directions, pawls for engaging with the ratchet wheels, sliding bars carrying said pawls, rock sleeves in the casing, arms connecting said bars to said sleeves, other arms extended in an outward direction from said rock sleeves, rollers carried by the free ends of said other arms, sliding bars in the casing and having cam shafts for engaging the said rollers, swinging levers carried by the car and having flexible connection with said sliding bars, and devices arranged at suitable points along the tracks for swinging said levers.

8. The combination with a car of a station indicator comprising a casing arranged in the car, a station indicating apron arranged in the casing, a casing secured to the bottom of the car, a vertical shaft in the casing and having driving connection with said apron, ratchet wheels arranged one above the other on said shaft and having their teeth extended in opposite directions, a pair of cam-bars arranged at opposite sides of the casing, a pawl engaging with one wheel, being operated from the cam-bars at one side of the casing, a pawl engaging with the other ratchet wheel and operated by the cam-bars at the opposite side of the casing, levers having swinging connection with the bottom of the car, flexible connections between said cam-bars and levers, and devices arranged along the railway between the tracks for swinging said levers.

9. The combination with a car of a station indicator comprising a casing arranged in the car, an indicating apron movable therein, a casing secured to the bottom of the car, a shaft in said casing having operative connection with said apron, ratchet wheels secured to said shaft one above the other, the teeth of said wheels being extended in opposite directions, pawls for engaging with the ratchet wheels, pairs of sliding cam-bars arranged in opposite sides of the casing, the bars of one side being adapted for operating one of the pawls, while the bars of the opposite side are adapted for operating the other pawl, springs for moving the bars in one direction, devices carried by the car for moving the lower bars in one direction, and means in the casing for moving the upper bars in the opposite direction to that of the springs.

10. The combination with a car, of a station indicator comprising a casing arranged in the car, a movable indicating apron in the casing, a casing secured to the bottom of the car, a vertical shaft in said casing, a driving connection between said shaft and the apron, ratchet wheels secured to the shaft and having their teeth extended in opposite directions, the said wheels being placed one above the other, a pawl for engaging with the upper ratchet wheel, a pawl for engaging with the lower ratchet wheel, and means for automatically actuating either one of said pawls, while the other pawl remains idle.

11. The combination with a car, of a station indicator comprising a casing arranged in the car, an indicating apron movable in said casing, a casing attached to the bottom of the car, a vertical shaft in said casing, ratchet wheels attached to said shaft one above the other and having their teeth extended in opposite directions, pawls engaging with the ratchet wheels, cam-bars slidable in the casing at opposite sides, the bars at one side being adapted to operate one of said pawls, while the bars at the opposite side are adapted for operating the other of said pawls, means carried by the car for moving said bars in one direction, one pair of bars independently of the other pair, a rotary cam-plate, a spring for moving said cam-plate in one direction, devices operated by said cam-plate for moving the upper cam-bars in one direction, holding devices for said cam-plate, and means operated by movements of the parts carrying pawls for releasing said locking devices to permit the cam-plate to rotate for operating a cam-bar.

12. The combination with a car, of a station indicator comprising a casing arranged in the car, an indicating apron movable in the casing, a casing secured to the bottom of the car, a vertical shaft in said last-named casing, ratchet wheels secured one above the other on said shaft and having their teeth extended in opposite directions, pawls for engaging with the ratchet wheels, sliding bars carrying said pawls, cam-bars at opposite sides of the casing respectively, operating the pawls, devices carried by the car for moving said cam-bars in one direction, the cam-bars at one side remaining stationary while the others are in operation, a rotary cam-plate, levers having connection with cam-bars at opposite sides of the casing, means operated by said cam-plate for swinging the levers, diametrically opposite lugs on the said cam-plate, one lug being on the upper side while the other is on the lower side, swinging fingers for engaging with the upper and lower lugs, means carried by the pawl-carrying-arms for swinging said fingers out of engagement with the lugs, and a spring for rotating the cam-plate upon one finger releasing its lugs until the other lug engages its finger.

13. The combination with a car, of a station indicator comprising a casing arranged in the car, an indicating apron movable in the casing, a casing secured to the bottom of the car, a vertical shaft in said last-named casing, ratchet wheels arranged one above the other on said shaft, a pawl for engaging with the upper ratchet wheel, a pawl for engaging with the lower ratchet wheel, rods extended in opposite directions from the pawls and mounted to slide, cam-bars at one side of the casing for operating one of said pawl-carrying-arms, cam-bars at the opposite side of the casing for moving the other pawl-carrying-arm there being two cam-bars arranged one above the other in each side of the said casing, devices carried by a car and adapted to be operated by obstructions arranged along the track, the said devices having connection with the lower cam-bars, a cam-plate, means actuated by said cam-plate for operating the upper cam-bars at either side of the casing, a lug on the upper surface of said cam-plate, a lug on the lower surface of the cam-plate and opposite the first-named lug, a rocking-shaft a finger thereon for engaging with the lower lug, a rocking-shaft independent of the first-named shaft, a finger extended therefrom for engagement with the upper lug, fingers extended from the shafts, cams on the pawl-carrying-arms for engaging the said last-named fingers to release the first-named fingers from their lugs, a spring causing rotary movement of the cam-plate, and means for automatically re-winding said spring.

14. The combination with a car, of a station indicator comprising a movable apron arranged in the car, a casing secured to the bottom of the car, a vertical shaft in said casing, ratchet wheels secured to said shaft one above the other and having their teeth extended in opposite directions, pawls engaging with the ratchet wheels, rods carrying said pawls and extending in opposite directions, the said rods being mounted to slide, a pair of cam-bars arranged at each side of the casing, one pair being adapted for operating one pawl rod while the other pair is adapted for operating the other pawl rod, a cam disk, a shaft on which said cam disk is loosely mounted, means operated by said cam disk for operating one of the cam-bars at either side of the casing, a spring having one end connected to the cam-disk and the other end connected to the shaft on which the cam-disk is loosely mounted, a beveled gear on said shaft, a beveled pinion engaging therewith, a shaft on which the beveled pinion is mounted, a pinion on the outer end of said shaft and mounted to swing, a ratchet-wheel-carrying shaft, a pinion on the said ratchet-wheel-carrying-shaft adapted for engagement by said swinging pinion, pawls engaging respectively with said ratchet-wheel at the upper and lower sides, the said last named ratchet engaging pawls being moved by the cam-bars, while the cam-bar is moved in one direction through the medium of the cam-disk to operate a pawl of one of the first-named ratchet wheels, locking devices for the cam-disk and controlled through the rods carrying the first-named pawls, and means operated by the expansion of the spring for moving the swinging pinion into engagement with the pinion on the shaft of the eccentric wheel.

15. The combination with a car, of a station indicator comprising a movable apron arranged in the car, a casing secured in the bottom of the car, a shaft in said casing, ratchet wheels arranged on said shaft and having their teeth extended in opposite directions, pawls for engaging with said ratchet wheels, sliding cam-bars arranged in pairs one pair at each side of the casing, devices actuated by said cam-bars for operating the pawls, swinging levers carried by the car for actuating either one of the cam-bars of a pair, a rotary cam-plate for operating one of said cam-bars at either side of the casing, locking devices for the cam-plate and controlled by movements of said pawls, a shaft on which the cam-plate is loosely mounted, a spring having one end connected to the cam-plate and the other end connected to said shaft, a shaft extended at right-angles to the cam-plate-carrying shaft and having gear connection therewith, a pinion on the outer end of said last-named shaft, a bearing in which said shaft is mounted so that said pinion may be swung inward and outward, a ratchet-wheel-carrying shaft, a pinion on said shaft for engagement with the swinging pinion, a ratchet-wheel on said shaft, pawls actuated from the cam-bars for operating said wheel, one pawl engaging with the ratchet wheel on the upper side while the other pawl engages with the ratchet wheel on the under side, and a swinging device comprising two members connected near the free end by a curved cross-bar provided at one end with a shoulder, a projection from the shaft carrying the swinging pinion adapted to engage with said shoulder, and also adapted for engagement with the said curved bar to move the swinging pinion into mesh with its companion pinion, and an extension on said swinging device adapted to be engaged by the spring for operating the swinging device to swing the pinion.

In testimony whereof I have signed my name to this specification in the presence of two subscribing witnesses.

HOMER ALLIN HILL.

Witnesses:
G. E. KING,
E. C. THEOBALD.